(12) United States Patent
Weiner et al.

(10) Patent No.: US 10,284,381 B1
(45) Date of Patent: May 7, 2019

(54) LOW LATENCY DATA DISTRIBUTION IN A COMPUTING SERVICE ENVIRONMENT

(71) Applicant: Amazon Technologies, Inc., Seattle, WA (US)

(72) Inventors: Isaiah Clark Weiner, Orinda, CA (US); Mathew Wolfgang Walter Lehwess, San Francisco, CA (US); Matthew Gordon Yanchyshyn, Brooklyn, NY (US)

(73) Assignee: Amazon Technologies, Inc., Seattle, WA (US)

( * ) Notice: Subject to any disclaimer, the term of this patent is extended or adjusted under 35 U.S.C. 154(b) by 230 days.

(21) Appl. No.: 14/980,153

(22) Filed: Dec. 28, 2015

(51) Int. Cl.
*H04L 12/18* (2006.01)
*H04L 12/751* (2013.01)
*H04L 12/741* (2013.01)

(52) U.S. Cl.
CPC .............. *H04L 12/18* (2013.01); *H04L 45/02* (2013.01); *H04L 45/745* (2013.01)

(58) Field of Classification Search
CPC ........ H04L 12/18; H04L 45/02; H04L 45/745
See application file for complete search history.

(56) References Cited

U.S. PATENT DOCUMENTS

| | | | |
|---|---|---|---|
| 2006/0029092 A1* | 2/2006 | Luo ...................... | H04L 12/1827 370/432 |
| 2008/0205394 A1* | 8/2008 | Deshpande ........... | H04L 12/185 370/390 |
| 2011/0044336 A1* | 2/2011 | Umeshima ............ | H04L 12/185 370/390 |
| 2011/0296474 A1* | 12/2011 | Babic ..................... | H04N 21/21 725/87 |

* cited by examiner

*Primary Examiner* — Ricky Q Ngo
*Assistant Examiner* — Stephen N Steiner
(74) *Attorney, Agent, or Firm* — Thorpe North & Western, LLP.

(57) ABSTRACT

A master node may be configured with helper nodes in a one-to-many structure in a multicast tree for data streaming. A master node may receive network requests from the helper nodes in order to construct a pingback response. A master node may establish a network latency, for each of the helper nodes according to the pingback responses, to form a broadcast timing index. A master node may create routing tables from the broadcast timing index for local multicast routing at helper nodes within the multicast tree. A master node may send the routing tables from the master node to each of the helper nodes to arrange helper nodes in proximity to one another and create helper tiers within the multi-cast tree. A master node may stream data from the master node to the helper nodes according to a center-to-edge order of the multicast tree based on the routing table.

20 Claims, 9 Drawing Sheets

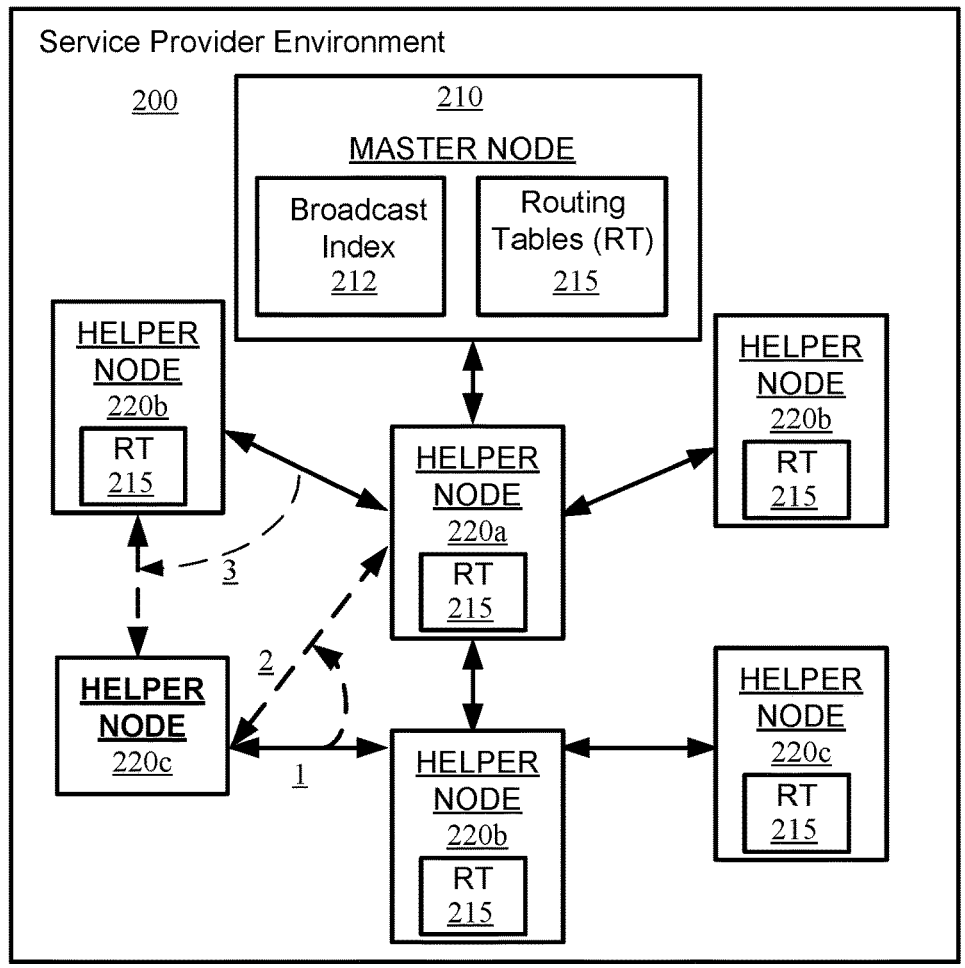

1) Determine whether a latency of one of the plurality of helper nodes (e.g., Helper Node 220c) exceeds a predefined threshold latency using the context index received from the master node 2) Reconnect Helper Node 220c from Helper Node 220b to Helper Node 220a to lower the latency below the predefined threshold latency 3) Disconnect Helper Node 220b from Helper Node 220a and reconnect Helper Node 220b underneath Helper Node 220c

FIG. 2

LOW LATENCY DATA DISTRIBUTION IN A COMPUTING SERVICE ENVIRONMENT

BACKGROUND

Computing systems may be found in the workplace, at home, or at school. Computing systems may include computing and data storage systems to process and store data, and current computing systems can interact and share media. For example, streaming media is becoming more and more popular with users. At present, a variety of streaming audio, video, networked gaming and/or other media content is available to consumers from any number of diverse unicast and broadcast sources. Media streams are also used to provide other types of network-based media content, as well as live and pre-recorded broadcast video, audio, and the like.

Currently, broadcast video systems that use computer networks face efficiency and latency challenges, such as, for example, where multiple different users or audience members want to view a media event at sufficiently the same time in order to avoid one user having ample time to consider the media event before the other user or audience members have viewed the media event on the same media feed. Systems and methods which may reliably and conveniently manage available networking resources while providing low latency multicast media streams to customers are valuable.

BRIEF DESCRIPTION OF THE DRAWINGS

FIG. 2 illustrates a system for redistributing a helper node in a multicast tree for achieving low latency multicasting for data distribution in a service provider environment according to an example of the present technology.

DETAILED DESCRIPTION

Figure 1A:
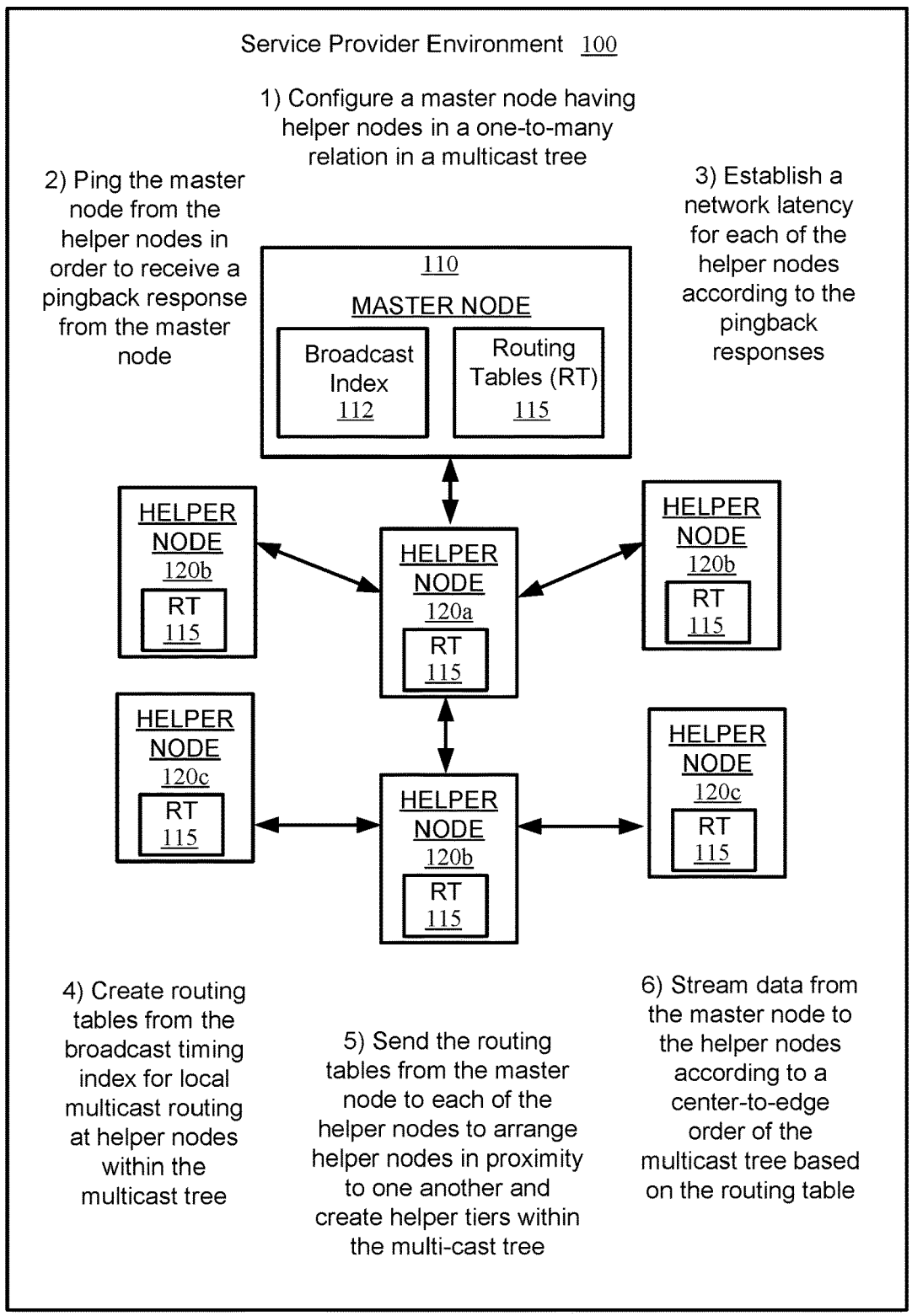
FIG. 1A illustrates a system for providing low latency multicasting for data distribution in a service provider environment according to an example of the present technology.

This technology relates to providing computing systems and resources, such as a streaming distribution service, for providing a low latency multicast network for data distribution in computing service environment. The streaming distribution service in the service provider environment may offer end users with access to information, such as low latency, live and/or pre-recorded data (e.g., prerecorded media) via multicast data distribution of streaming data. Examples of such streaming data may be video, audio, gaming data, device automation instructions, and other streaming data.

Two example scenarios for broadcasting media, which may use synchronization are: 1) prerecorded media and 2) a live feed of media. When distributed through the present technology, both the prerecorded media and the live feed of media may use a temporal index, low latency signaling, and a predefined latency threshold (e.g., a user-defined 'acceptable lag' parameter). The temporal index may be centrally distributed and "fan out" (e.g., the distribution of the temporal index may not require all hosts to use a single distribution point), and the temporal index may be a serial temporal index. For prerecorded media, the temporal index may provide timing information, relative to a start signal, for sending the broadcast to any connected nodes and clients. For live streams, the temporal index may be a self-check method for distributed systems to assist the user viewing the live media feed to know whether a distribution node or client is 1) falling behind and out of synchronization with the live media feed, and/or 2) healthy and in synchronization with the live media feed.

To initiate a streaming distribution service, a master node may be configured having helper nodes in a one-to-many relationship in a multicast tree for data streaming. The master node may be pinged (e.g., receive a network request) from each of the helper nodes in order to receive a pingback response from the master node. A network latency may be established for each of the plurality of helper nodes according to the pingback responses received from the plurality of helper nodes, and the aggregated network latency may be used to form a broadcast timing index. Routing tables may be created from the broadcast timing index for local multicast routing within the multicast tree. A routing table may be sent from the master node to each of the helper nodes. Data may be streamed from the master node to the helper nodes according to a center-to-edge order of the multicast tree based on the routing tables.

In one aspect, streamed data may flow from the master node to each of the adjacent, helper nodes (i.e., connected helper nodes with a low latency connection). For every packet sent to a helper node (e.g., a helper node adjacent to other helper nodes or directly connected to the master node), multiple packets may be sent from the originating helper node to other helper nodes. For example, packets may be sent to the helper nodes adjacent to the helper node and the originating helper node may ultimately be connected to the master node. Each helper node may have "N" amount of bandwidth into the helper node and between 2N to 100N of bandwidth output from the helper node to the additional helper nodes (e.g., 3N or 4N may be a practical amount of output bandwidth from helper nodes). While some data streams such as very high resolution video (e.g., 4K resolution) may consume heavy amounts of bandwidth and practically limit the number of streams that may be sent from a helper node, there is no theoretical limit on the number of adjacent nodes that can be sent data streams. The present technology is not a centralized system because of the heavy load that would otherwise put on a centralized resource. This distributed system is more effective than a centralized system because data streams are not all sent out through one large pipe.

In one example, the master node is configured having helper nodes which may be in a one-to-many organization in a multicast tree for data streaming. The master node may be pinged by each one of the helper nodes to establish a network latency for each one of the helper nodes. The master node may receive the network latency from the helper nodes and store the network latency in a broadcast timing index. Routing tables may be created from the broadcast timing index for local multicast routing within the multicast tree. A routing table may be sent for local multicast routing from the master node to each of the helper nodes in the first level of the multicast tree and also to identified helper nodes in one or more Nth layers according to the routing table. A single continuous media file may be multicast from the master node to helper nodes according to a center-to-edge order of the multicast tree based on the routing table. As described earlier, a master node may be connected directly one or more helper nodes (e.g., forming a first layer of helper nodes), while other helper nodes are indirectly connected to the master node. That is, additional helper nodes may be in a second layer and may be connected to the first layer helper nodes, which are directly connected to the master node. The master node as configured with helper nodes may form the multicast tree, and any number of layers may be formed in the multi-cast tree. For example, the multicast tree may be a linear placement Petri Net model with timing ('timed Petri net').

In one aspect, a helper node may dynamically reconfigure (e.g., move and change) a position in the multicast tree cluster to reduce the broadcast latency of the helper node below the predefined latency threshold. If changing the position in the multicast tree cluster fails to bring the helper node's latency below the predefined latency threshold, the helper node may be removed or remove itself from the multicast tree cluster and shut down. That is, an existing helper node may be reassigned positions within the multicast tree cluster or be removed completely. The reassigned helper node may rejoin the multicast tree cluster and rediscover a reassignment position for the reassigned helper node. The reassigned helper, which was instructed to rejoin the network, may become a distribution target at a new rank or level in the tree nested under the new helper node.

In one aspect, a new helper node may join the multicast tree cluster. In order to do so, the new helper node is informed about the multicast tree cluster to understand the data distribution topology of the multicast tree cluster and negotiate an appropriate configuration for the new helper node, as well as register for data distribution or redistribution if the helper node is to start a new layer in the multicast tree cluster. In one example aspect, to join the multicast tree cluster, the new helper contacts the master node via the REST API, which returns a list of existing helper nodes and the configuration of the multicast tree cluster.

The master node may automatically adjust the broadcasting paths of the data based on 1) the amount of bandwidth available between the helper nodes, 2) a latency between each of the helper nodes, and 3) a predefined latency threshold defined by the user. As a result, the streaming of the data at the helper nodes may be adjusted by the master node, according to: an available output bandwidth at a helper node to send streaming data to other helper nodes, the predefined latency threshold set by a user (i.e., total latency from a master node to a helper node is set to be under 500 milliseconds), and a latency tolerance level of each of the helper nodes (e.g., adjusting the adjacency of helper nodes to keep latency between two helper nodes low). The master node may control the topology change of the multicast tree cluster in response to these factors.

FIG. 1A illustrates a system 100 for providing a low latency multicast data distribution service in a service provider environment according to an example of the present technology. The system 100 may include a master node 110 and one or more helper nodes 120 (illustrated in FIG. 1A as 120a, 120b, and 120c) within service provider environment 100, which may provide virtualized computing services (i.e., virtualized computing services, virtualized networking, etc.) to a user. More specifically, the service provider environment may provide virtualized computing, virtualized storage, virtualized networking and other virtualized services that are executing on a hardware substrate. Also, the master node 110 may be in data communication with each of the helper nodes 120 by way of a network that may include a virtual network that is within a service provider environment or other suitable networks, etc.

In operation, the master node 110 may have a broadcast index 112 and routing tables 115 (e.g., "routing maps"). The master node 110 may be 1) configured with the helper nodes 120 in a one-to-many relationship in a multicast tree for data streaming. The master node 110 may be 2) pinged from the helper nodes in order to receive a pingback response from the master node 110. A network latency may be 3) established for each of the helper nodes according to the pingback responses received from the helper nodes 120 by the master node 110. The network latency reports from helper nodes may be used to form a broadcast index (e.g., a "broadcast timing index"). The routing tables 115 may be 4) created from the broadcast timing index for local multicast routing at helper nodes within the multicast tree. The routing tables may be 5) sent from the master node to each of the helper nodes to arrange helper nodes in proximity to one another and create helper tiers within the multi-cast tree. Data may be 6) streamed from the master node to the helper nodes according to a center-to-edge order of the multicast tree based on the routing table.

In one aspect, as described herein and/or using the various embodiments described in FIG. 1A, at the initiation of a multicast tree cluster, the master node may receive, from each helper node a ping, such as a universal datagram protocol (UDP) ping of the master node. A pingback response may be received that may include an elapsed time indicating the amount of time to send the ping and receive the pingback response. Each helper node may adjust both the results for the master node's fetch time and the helper node's time used to make and receive the request. The difference may yield the network latency, which may be used to create a broadcast index. This process may be a service ping sent from any node in the multicast tree cluster at any level in the multicast tree cluster.

In another aspect, at the initiation of broadcast of prerecorded data (e.g., broadcast of a media event stream), prerecorded media schemas may be distributed to the helper nodes. The media schemas may contain a mapping of index entries to media files and/or objects. Each helper node may have enough cached media to begin the broadcast. However, if the broadcast of the data (e.g., a media event) is a live stream, the system may skip the process of receiving prerecorded media schemas and the recipients of the live stream may receive blank screens until the live stream begins to broadcast. That is, there are no prerecorded media schemas for live stream data. The terms prerecorded data and prerecorded media will be used throughout the discussion here, but the term "prerecorded media" is considered to be an example of the many types of "prerecorded data" that may be sent via the multicast tree.

Next, while the multicast tree cluster is waiting to be sent an index entry (e.g., the distribution of the prerecorded media schemas as explained above), each helper may poll the master via a representational state transfer (REST) application-programming interface (API) for a broadcast status. When the broadcast is about to begin, the API response state may reflect a broadcast countdown timer (e.g., a countdown of a small number of seconds). When the broadcast countdown timer is expired, the master node may issue an index entry to each first layer helper node. The master node may also issue the index entry in parallel to each first layer helper node. Each first layer helper node may then redistribute the data to second layer helpers, and so forth up to an Nth layer of helper nodes. The contents of the helper node's memory may be passed and forwarded without copying (or by otherwise minimizing processing time). A response may be sent back to each helper node sender (e.g., the response may be an index suffix acknowledgement). If no response is received by the helper node sender before the next index entry is sent, a waiting helper node can log the issue and/or the unresponsive helper node may be removed from the multicast tree cluster.

Once a helper node has received an index entry, the helper node can receive media bytes corresponding to the index entry to a hypertext transfer protocol (HTTP) client connection established, for example, using a multicast load balancer or a dynamic adjacency table. If the broadcast is a live stream, the helper node receives the media data to be presented and the index entry. In one configuration, the receipt of the media data and the index entries is performed in a loop for receiving the live stream and/or playback of pre-recorded data. That is, the loop continuously receives the media data and the index entries until the live stream ends and/or the media file is completed.

It should be noted that during a live stream loop, at least four major actions are performed. First, internal metrics (e.g., internal metrics for a network, a central processing unit "CPU", and/or internal components of the service provider environment) may be reported to a monitoring service, such as a virtual monitoring service to monitor computing resources, collect and track metrics, collect and monitor log files, issue and/or set alarms, and obtain information relating to resource utilization, application performance, and operational health.

For example, if transmission control protocol (TCP) multicast is used, the helper nodes may report to the master node and the master can report to the monitoring service. The master node may communicate and report to every helper node information about every other helper node in the multicast tree cluster. Also, TCP acknowledgment requests (ACKs) may be sent for each data packet so as to obtain timing information from a socket or from other helper nodes. By sending and/or receiving the TCP ACKs, a latency time may be obtained between the master node and each of the helper nodes, and/or a latency time between a helper nodes and other helper nodes in the multicast tree cluster. If the universal datagram protocol (UDP) transport layer protocol is used to multicast, the acknowledgement (ACKs) may be computed for the latency time to obtain timing information. In one aspect, the latency time may impact the size of the multicast tree cluster depending on the user's pre-defined latency threshold defined for the multicast tree cluster.

Second, as playback progresses, pre-fetching may be performed for prerecorded media files. That is, a node may be pre-loading media content with pre-recorded media. Cache index entries seen by the audience are expired. Also, pre-recorded media may start to be played at a same time for one or more nodes (e.g., helper nodes), but playback streams from the helper nodes may be allowed to become out of synchronization at a later point in time. The pre-recorded media play back allows for a larger multicast tree cluster and a light weight index system may be used for transmitting smaller media packets that may be dozens of bytes. In this way, the nodes that may be out of synchronization with each other is minimized.

Third, a user may define a predefined latency threshold. As such, if a network latency exceeds the predefined latency threshold parameter, the helper node may perform a special "service ping" to other helper nodes sampled for latency (e.g., randomly sampled nodes) and the helper node may be instructed by the master node to change its location in the multicast tree cluster. That is, the helper node may change a position in the multicast tree cluster to reduce the broadcast latency below the predefined latency threshold. If changing the position in the multicast tree cluster fails to bring the nodes latency below the predefined latency threshold, the helper node may be removed or remove itself from the multicast tree cluster and shut down. In one aspect, the master node may automatically adjust the broadcasting of the data based on 1) the amount of bandwidth available between the helper nodes, 2) a latency between each of the helper nodes, and 3) a predefined latency threshold defined by the user. That is, the streaming of the data at the helper nodes may be adjusted by the master node, according to an available output bandwidth at a helper node, the predefined latency threshold, and a latency tolerance level of each of the helper nodes. The master node may control the topology change of the multicast tree cluster in response to these factors.

Fourth, an auto scaling operation may start new instances based on internal metrics obtained by the monitoring service that may reflect a CPU load on helper nodes in the multicast tree cluster. In order to instantiate more helper nodes to support the multicast tree cluster, the execution of the service provider environment may have minimal start time requirements.

Also, the low latency multicast data distribution service may have a small configuration for startup of the broadcast and the small configuration may be: a pair of nodes (e.g., a master and a helper node), a data set to distribute, an access method (such as a load balancer and gateways) and clients to receive the broadcast from helper nodes. In one configuration, a node may receive the broadcast data in a single, continuous stream, with the TCP receive window scaling enabled and a large maximum segment size that enables a significant amount of data to be transferred to the node without acknowledgement. Support for ongoing resolution negotiation in a request for receiving the broadcasted data, which may occur in current media players, may be accommodated for prerecorded media by the request uniform resource identifier (URI) specifying a resolution for the broadcast data. For live streaming of the data, transcoding for resolution changes may be performed on the fly.

In contrast to the small startup configuration, the low latency multicast data distribution service in a large configuration for a startup broadcast may include one program on a computing instance per availability zone (i.e., per data center in a geographical zone) of the multicast tree cluster. For example, one running program may be the master node and the other running programs may be the helper nodes until a different consensus is reached and a helper node becomes the master node. Node traffic may be directed at these systems via a multicast load balancer, a dynamic adjacency table, and/or multicast database cluster, which may define a virtual internet protocol (VIP) for each availability zone and corresponding helper node. A scalable virtual domain name service (DNS) may provide round-robin DNS records to distribute the VIPs to each node in the multicast tree cluster.

The master node 110 and/or the helper nodes 120 may be arranged, for example, in one or more server banks, computer banks or other computing arrangements. For example, the master node 110 and/or the helper nodes 120 together may comprise a clustered computing resource, virtualization server, a grid computing resource, and/or any other distributed computing arrangement. The master node 110 and/or the helper nodes 120 may each be located in a single installation and/or may be distributed among many different geographical locations. In one aspect, the helper node 120a may be considered to be in a first layer (or first line) within a multicast tree cluster. The helper nodes 120b may each be considered to be in a second layer (or second line) within a multicast tree cluster. In one aspect, helper nodes 120c may be considered to be in an "nth" layer (or nth line), such as in a third layer, within a multicast tree cluster.

In one aspect, the clients who receive data streams (e.g., video, audio, etc.) from the helper nodes 120 may each comprise and/or be associated with, for example, a processor-based system such as a computer system. Such a computer system may be embodied in the form of a desktop computer, a laptop computer, personal digital assistants, cellular telephones, smartphones, voice-controlled playback devices (e.g., smart speakers), set-top boxes, network-enabled televisions, music players, tablet computer systems, game consoles, electronic book readers, or other devices with like capability. The clients may each be configured to execute various applications, and/or other applications. The applications may correspond to code that is executed in the client (e.g., such as being executed in a browser or web applications). The applications may also correspond to standalone applications, such as networked applications.

The clients may include and/or be coupled to a display device. A browser may be executed on the clients, for example, to access and render network pages (e.g. web pages) or other network content served and/or other servers. In one aspect, the clients may each contain or include a display device that may comprise, for example, one or more devices such as cathode ray tubes (CRTs), liquid crystal display (LCD) screens, gas plasma-based flat panel displays, LCD projectors, or other types of display devices, etc. In addition, the clients may include an audio device, tactile device (e.g., braille machine) or another output device to feedback to a customer.

Figure 1B:
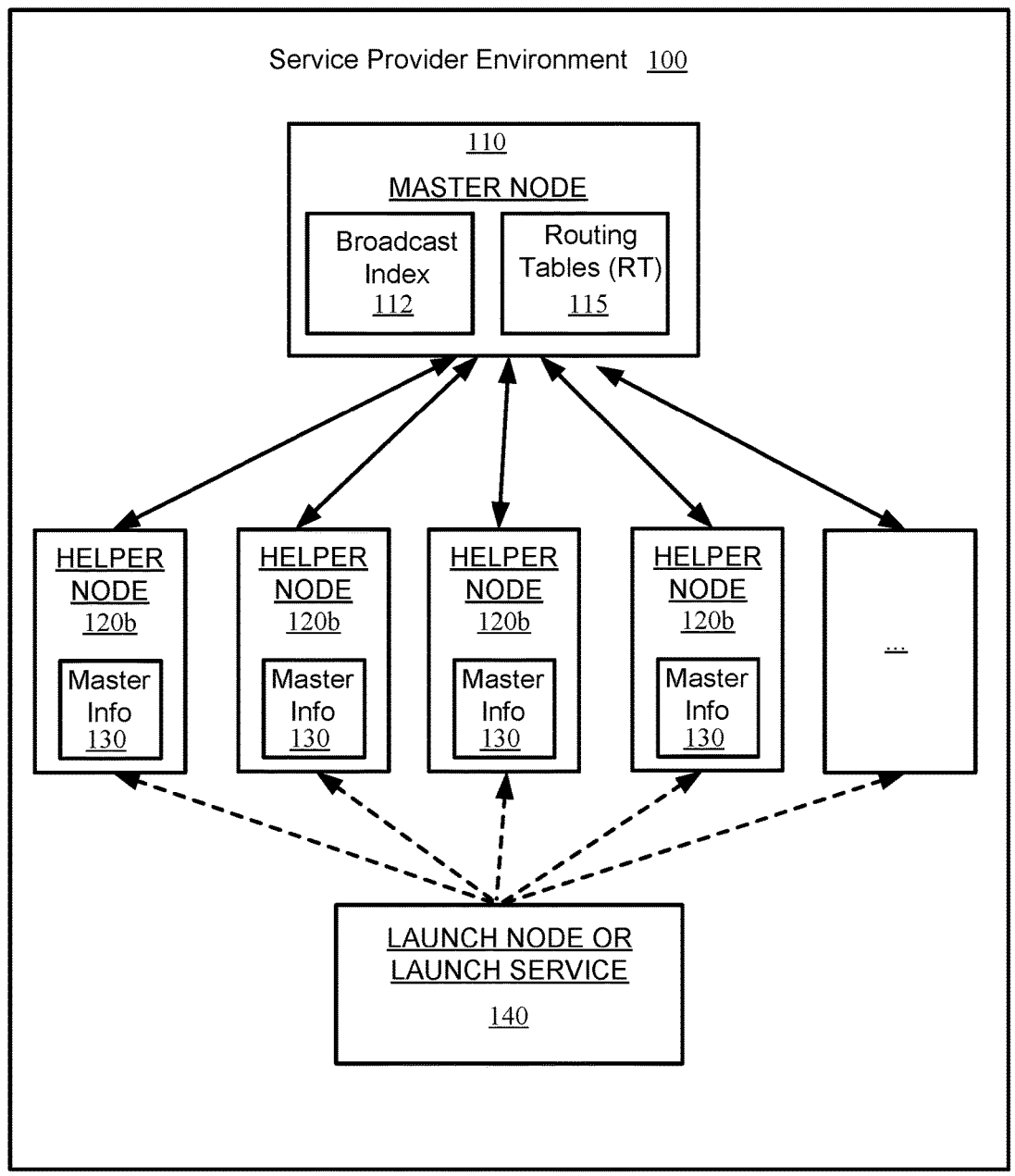
FIG. 1B illustrates a system for launching helper nodes that are aware of a master node according to an example of the present technology.

FIG. 1B illustrates an example of the initial launching of the helper nodes along with information about the master node 110 (or a centralized multicast service) before the multicast tree is able to organize itself into one or more tiers. Each of the helper nodes 120b may be launched with master information 130 about a master node 110. This information may include a public or private IP (internet protocol) address of the master node 110 or other networking or route information for the master node 110 in the virtual network of the service provider environment 110. The helper node may be a computing instance or a virtual machine that executes an operating system (OS) and applications on an instance manager of host hardware.

A launch service 140 or launch node that interfaces with or is part of a multicast service maybe used to launch a cluster of helper nodes 120b of a size which are estimated to satisfy an expected demand for media streams or data connections to the helper nodes based on the number of clients that have registered (or are expected) to receive data from the multicast network through the helper nodes 120b. In some configurations, the launch node 140 may be the master node 110 or the launch node may be an independent service that is a managed service within the service provider environment. In an alternative configuration, the helper nodes 120b may be initially launched without knowledge of the master node 110 but the launch service 140 or master node 110 may provide that master information 130 shortly after the launch of the helper node 120b has completed.

Once the helper nodes 120b have launched and are ready to join the service, the helper nodes 120b can ping or make a network request to the master node 110 using the master information 130 that was previously received at launch time in order to determine round trip communication time for each helper node 120b to receive a response from the master node 110. As described earlier, the time taken for a helper node 120b to receive a communication from the master node may then be reported back to the master node 110 to build the broadcast index 112. The setup of the multicast network may then proceed as described earlier in FIG. 1A and later in this discussion.

In one aspect, one of the helper nodes may be redistributed within the multicast tree cluster. FIG. 2 illustrates the system 200 for redistributing a helper node in a multicast tree for achieving low latency multicasting for data distribution in a service provider environment. In one aspect, an operation may be performed to determine whether a latency of one of the helper nodes exceeds a predefined threshold latency using a content index received from the master node. The content index may be separate from the broadcast timing index and can be a time stamp. As such, a helper node having the latency equal to or greater than the predefined threshold latency may have the connection of the helper node moved to directly connect with the master node and/or to connect to another position in the multicast tree to lower the latency below the predefined threshold latency. For example, helper node 220c may be determined to have a latency equal to or greater than the predefined threshold latency. As such, the helper node 220c may be 2) reconnected, from the helper node 220b, to the helper node 220a, in order to lower the helper node's 220c latency. As such, helper node 220c may move from an "nth" layer of the multicast tree cluster to a second layer of the multicast tree cluster. If necessary and/or as an alternative to steps 1 and 2 above, a helper node 220b located in the second layer of the multicast tree cluster may be 3) requested to disconnect from the second layer and reconnect to the newly positioned helper node in the nth layer of the multicast tree cluster.

Figure 3:
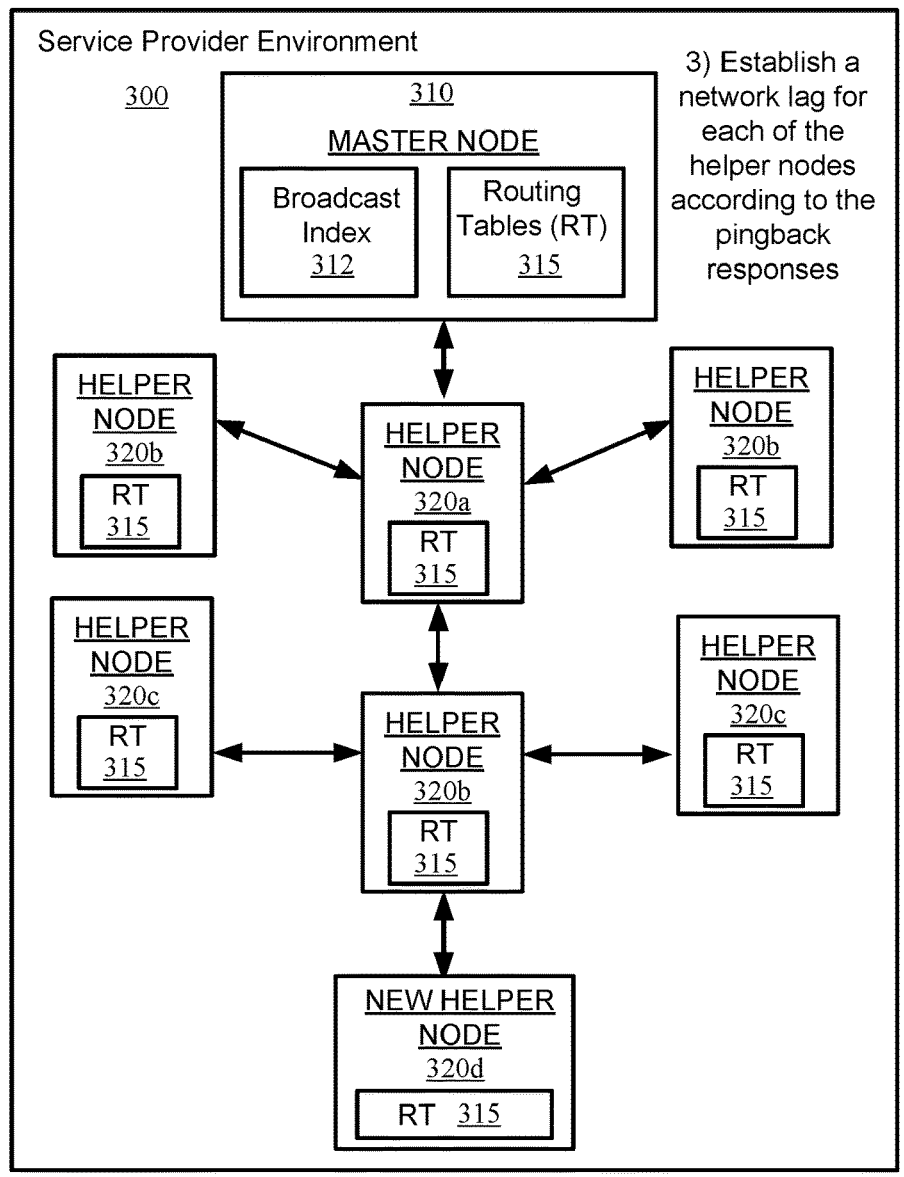
FIG. 3 illustrates a system for adding a helper node in a multicast tree for achieving low latency multicasting for data distribution in a service provider environment according to an example of the present technology.

In one aspect, a new helper node may be added within the multicast tree cluster. FIG. 3 illustrates the system 300 for adding a helper node in a multicast tree for achieving low latency multicasting for data distribution in a service provider environment according to an example of the present technology. In one aspect, an operation may be performed to 1) receive contact at the master node 310 by a new helper node 320d desiring to join the multicast tree. A configuration listing of the multicast tree is provided to new helper node 320d. A service ping may be 2) issued to each one of the helper nodes 320 in the multicast tree according to the configuration listing. A determination operation may be performed to 3) determine one or more close helper nodes (e.g., helper node 320b or helper nodes 320c) to the new helper node 320d according to a service pingback response.

Also, the new helper node 320d may 4) receive permission to be a distribution target in the routing table from one of the close helper nodes, such as the helper node 120b, for receiving the streamed data add a new helper node to the multicast tree using a service ping. The new helper node 320d may be 5) added to the multicast tree. That is, the closest node to the new helper node 302d may be determined to be a helper node 320b to which the new helper node 320d may connect. As such, the new helper node 320d is added to the routing table for helper node 320a and becomes a distribution target for helper node 320a to forward the streamed media to helper node 320b and the new helper node 320d. Also, the new helper node 320d may be added to a new nth layer in the multicast tree cluster.

In one aspect, as described herein and/or using the various embodiments described in FIG. 3, a helper node may join the multicast tree cluster. In order to do so, the new helper node may be informed about the multicast tree cluster to understand the data distribution topology of the multicast tree cluster and negotiate an optimal configuration for the new helper node, as well as register for data distribution or redistribution if the helper node is to start a new layer in the multicast tree cluster. The number of helpers per layer may be based on a resolution of the media and the network capabilities of the master node or host. For example, a 1080p high definition (HD) full motion video device may require 20 gigabytes (GB) per minute (GB/minute), or 333 megabyte (MB) per second (e.g., MB/second (2.6 gigabyte per second "Gbps"). A data compression and/or deduplication engine may be used reduce these requirements.

In one example scenario, to join the multicast tree cluster, the new helper contacts the master node via the REST API, which returns a list of existing helper nodes and the configuration of the multicast tree cluster. The new helper node contacts each existing helper and performs a service ping to understand which of the nodes are closest to the new helper node. The helper node may send a request to one or more of the closest helper nodes to be a distribution target. If there are no available distribution slots in any existing helper node, a separate request may be sent to the closest existing helper node for redistribution permissions, along with the service ping results of the other helper nodes. The existing helper node (e.g., the closest helper node to the new helper node) performs a service ping to each of the helper nodes connected to the existing helper nodes, and designates a candidate helper node for reassignment (e.g., to any other helper node in the cluster or even to the new helper node) based on the combined latency data. A retry result may be returned to the new helper node. The existing helper node may instruct the reassignment candidate to rejoin the cluster and rediscover the reassignment candidate's location. The new helper node retries sending the redistribution request. The existing helper node may grant the new helper redistribution permissions. The reassigned helper, which was instructed to rejoin the network, may become a distribution target at a new rank, nested under the new helper node.

It should be noted that the parameters around acceptable network latency (e.g., lag), the internal timing awareness, and the bandwidth being evenly divisible amongst the nodes in the multicast tree cluster may be set to help ensure each layer is balanced.

Figure 4:
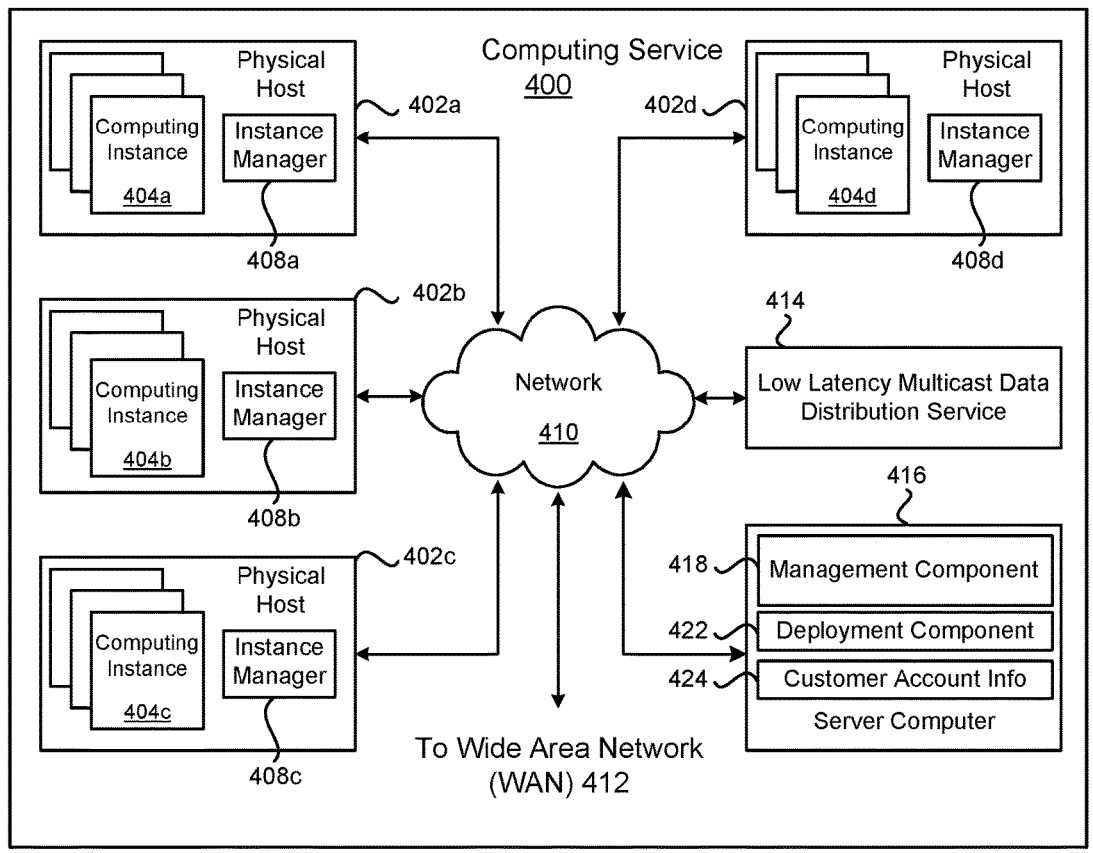
FIG. 4 is a block diagram that illustrates an example computing service environment that includes a low latency multicast data distribution service according to an example of the present technology.

FIG. 4 is a block diagram illustrating an example computing service 400 that may be used to execute software services for providing a low latency multicast data distribution service in a service provider environment. In particular, the computing service 400 depicted illustrates one environment in which the technology described herein may be used.

The computing service 400 may be one type of environment that includes various virtualized service resources that may be used, for instance, to host computing instances 404a-d on which a computing service may execute.

The computing service 400 may be capable of delivery of computing, storage and networking capacity as a software service to a community of end recipients. In one example, the computing service 400 may be established for an organization by or on behalf of the organization. That is, the computing service 400 may offer a "private cloud environment." In another example, the computing service 400 may support a multi-tenant environment, wherein a plurality of users may operate independently (i.e., a public cloud environment). Generally speaking, the computing service 400 may provide the following models: Infrastructure as a Service ("IaaS"), Platform as a Service ("PaaS"), and/or Software as a Service ("SaaS"). Other models may be provided. For the IaaS model, the computing service 400 may offer computers as physical or virtual machines and other resources. The virtual machines may be run as guests by a hypervisor, as described further below. The PaaS model delivers a computing platform that may include an operating system, programming language execution environment, database, and web server.

Application developers may develop and run their software solutions on the computing service platform without incurring the cost of buying and managing the underlying hardware and software. The SaaS model allows installation and operation of application software in the computing service 400. End users may access the computing service 400 using networked client devices, such as desktop computers, laptops, tablets, smartphones, etc. running web browsers or other lightweight client applications, for example. Illustratively, the computing service 400 may be described as a "cloud" environment.

The particularly illustrated computing service 400 may include a plurality of server computers 402a-d. While four server computers are shown, any number may be used, and large data centers may include thousands of server computers. The computing service 400 may provide computing resources for executing computing instances 404a-d. Computing instances 404a-d may, for example, be virtual machines. A virtual machine may be an instance of a software implementation of a machine (i.e., a computer) that executes applications like a physical machine. In the example of a virtual machine, each of the server computers 402a-d may be configured to execute an instance manager 408a-d capable of executing the instances. The instance manager 408a-d may be a hypervisor, virtual machine monitor (VMM), or another type of program configured to enable the execution of multiple computing instances 404a-d on a single server. Additionally, each of the computing instances 404a-d may be configured to execute one or more applications.

Some of the servers may be used for executing a low latency multicast data distribution service. For example, a server computer 414 may execute a low latency multicast data distribution service in a computing service environment. For example, the low latency multicast data distribution service may act as the master node and use computing instances 404a-c as helper nodes or the low latency multicast data distribution service may use a computing instance 404a-c as the master node which communicates with other helper nodes that are computing instances 404a-c.

One or more server computers 416 may be reserved to execute software components for managing the operation of the computing service 400 and the computing instances 404a-d. A server computer 416 may execute a management component 418. A user may access the management component 418 to configure various aspects of the operation of the computing instances 404a-d purchased by a user. For example, the user may setup computing instances 404a-d and make changes to the configuration of the computing instances 404a-d.

A deployment component 422 may be used to assist users in the deployment of computing instances 404a-d. The deployment component 422 may have access to account information associated with the computing instances 404a-d, such as the name of an owner of the account, credit card information, country of the owner, etc. The deployment component 422 may receive a configuration from a user that includes data describing how computing instances 404a-d may be configured. For example, the configuration may include an operating system, provide one or more applications to be installed in computing instances 404a-d, provide scripts and/or other types of code to be executed for configuring computing instances 404a-d, provide cache logic specifying how an application cache may be prepared, and other types of information. The deployment component 422 may utilize the user-provided configuration and cache logic to configure, initialize, and launch computing instances 404a-d. The configuration, cache logic, and other information may be specified by a user accessing the management component 418 or by providing this information directly to the deployment component 422.

User account information 424 may include any desired information associated with a user of the multi-tenant environment. For example, the user account information may include a unique identifier for a user, a user address, billing information, licensing information, customization parameters for launching instances, scheduling information, etc. As described above, the user account information 424 may also include security information used in encryption of asynchronous responses to API requests. By "asynchronous" it is meant that the API response may be made at any time after the initial request and with a different network connection.

A network 410 may be utilized to interconnect the computing service 400 and the server computers 402a-d, 416. The network 410 may be a local area network (LAN) and may be connected to a Wide Area Network (WAN) 412 or the Internet, so that end users may access the computing service 400. The network topology illustrated in FIG. 4 has been simplified; many more networks and networking devices may be utilized to interconnect the various computing systems disclosed herein.

Figure 5:
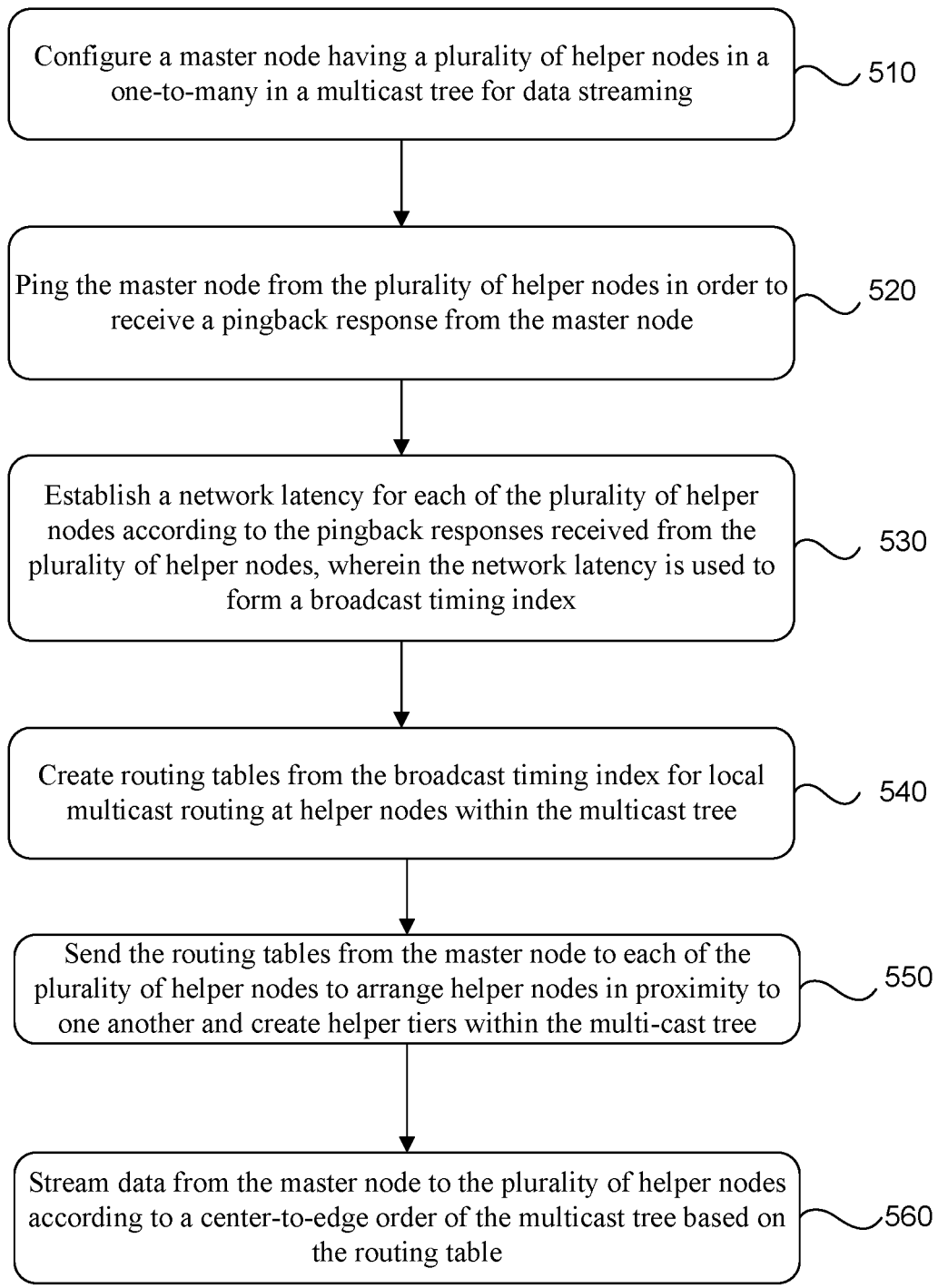
FIG. 5 is a flowchart of an example method for providing low latency multicast data distribution in a service provider environment according to an example of the present technology.

FIG. 5 is a flowchart of an example method for providing a low latency multicast for data distribution in a computing service environment according to an example of the present technology. The functionality may be implemented as a method and executed as instructions on a machine, where the instructions are included on at least one computer readable medium or one non-transitory machine-readable storage medium. For example, starting in block 510, a master node having helper nodes may be configured in a one-to-many relationship in a multicast tree for data streaming. The master node may be pinged from the helper nodes in order to receive a pingback response from the master node, as in block 520. A network latency for each of the helper nodes can be established according to the pingback responses received from the plurality of helper nodes, as in block 530. The network latency can be used to form a broadcast timing index. Routing tables (e.g., routing table maps) may be created from the broadcast timing index for local multicast routing at helper nodes within the multicast tree, as in block 540. The routing table may be sent from the master node to each of the helper nodes to arrange helper nodes in proximity to one another and create helper tiers within the multi-cast tree, as in block 550. Data may be streamed from the master node to the plurality of helper nodes according to a center-to-edge order of the multicast tree based on the routing table, as in block 560.

Figure 6:
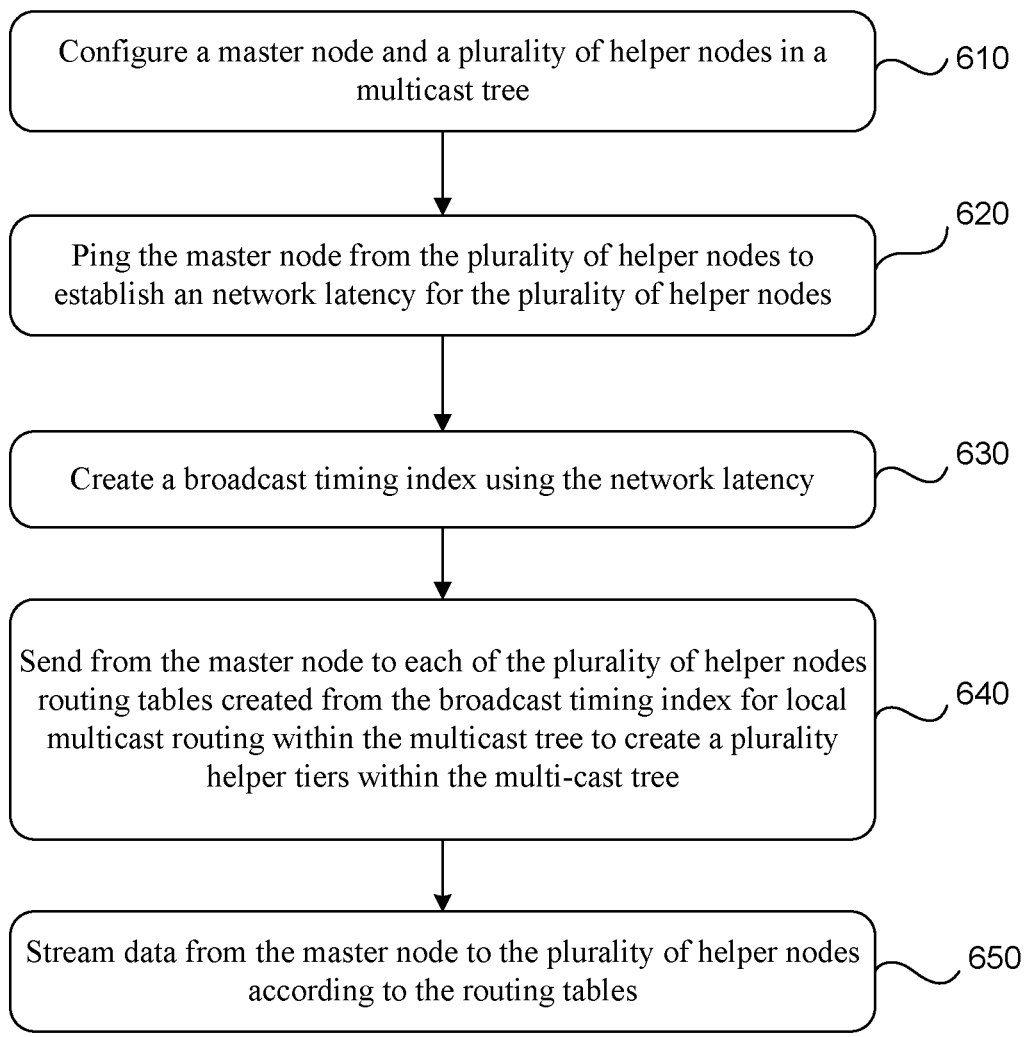
FIG. 6 is a flowchart of an additional example method for providing low latency multicast data distribution in a service provider environment according to an example of the present technology.

FIG. 6 is a flowchart of an additional example method for providing low latency multicast data distribution in a service provider environment according to an example of the present technology. The functionality may be implemented as a method executed as instructions on a machine, where the instructions are included on at least one computer readable medium or one non-transitory machine-readable storage medium. Starting in block 610, a master node may be configured having helper nodes may be in a one-to-many in a multicast tree. The master node may be pinged from the helper nodes to establish a network latency for the helper nodes, as in block 620. A broadcast timing index may be created using the network latency, as in block 630. Routing tables, created from the broadcast timing index, may be sent from the master node to each of the helper nodes for local multicast routing within the multicast tree to create a helper tiers (e.g., a first layer, a second layer, an "nth" layer) within the multi-cast tree, as in block 640. Data may be streamed from the master node to the helper nodes according to the routing table, as in block 650.

In one aspect, the service provider environment may include one or more processes executing on a server or other computer hardware. Such services may be centrally hosted functionality or a service application that may receive requests and provide output to other services or user devices. For example, modules providing services may be considered on-demand computing that are hosted in a server, cloud, grid, or cluster computing system. An application program interface (API) may be provided for each module to enable a second module to send requests to and receive output from the first module. Such APIs may also allow third parties to interface with the module and make requests and receive output from the modules. Third parties may either access the modules using authentication credentials that provide on-going access to the module or the third party access may be based on a per transaction access where the third party pays for specific transactions that are provided and consumed.

Figure 7:
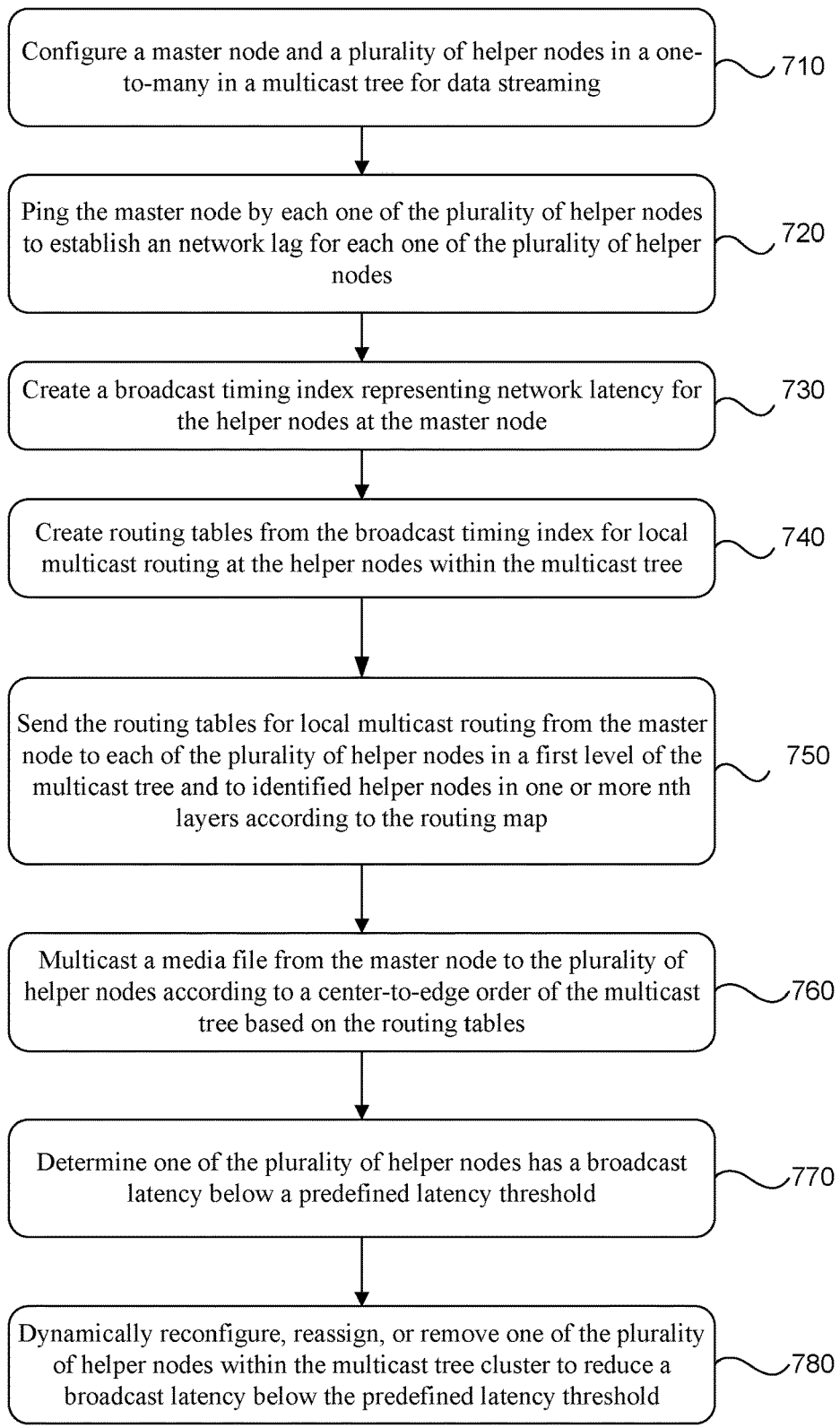
FIG. 7 is a flowchart of an additional example method for providing low latency multicast data distribution in a service provider environment according to an example of the present technology.

FIG. 7 is a flowchart of an additional example method for providing low latency multicast data distribution in a service provider environment according to an example of the present technology. The functionality may be implemented as a method executed as instructions on a machine, where the instructions are included on at least one computer readable medium or one non-transitory machine-readable storage medium. Starting in block 710, a master node may be configured having helper nodes may be in a one-to-many in a multicast tree for data streaming. The master node may be pinged by each one of the helper nodes to establish a network latency for each one of the helper nodes, as in block 720. The master node may create a broadcast timing index representing network latency for the helper nodes at the master node, as in block 730. Routing tables may be created from the broadcast timing index for local multicast routing at the helper nodes within the multicast tree, as in block 740. The routing tables may be sent for local multicast routing from the master node to each of the helper nodes in a first level of the multicast tree and to helper nodes in one or more nth layers according to the routing table, as in block 750. A media file may be multicast from the master node to the helper nodes according to a center-to-edge order of the multicast tree based on the routing tables, as in block 760. A determination operation may determine one of the plurality of helper nodes has a broadcast latency below a predefined latency threshold, as in block 770. One or more of the helper nodes may be dynamically reconfigured, reassigned, and/or removed within and/or from the multicast tree cluster to reduce a broadcast latency below the predefined latency threshold, as in block 780.

In one aspect, in conjunction with and/or as part of at least one block of FIGS. 5-7, the methods of 500, 600, and/or 700 may include each of the following. In one aspect, a content index may be distributed for a prerecorded media file to each of the helper nodes. The master node may be polled by the each of the helper nodes for a broadcasting status via a representational state transfer (REST) application protocol interface (API). A countdown may be provided using the REST API indicating a start time for streaming the data that is content index data. The media content corresponding to the content index can be sent to the helper nodes.

In one aspect, the routing table may be sent for local multicast routing to each of the helper nodes in a first level of the multicast tree. The streamed data may be forwarded from a helper node in a first level of the multicast tree to identified helper nodes in one or more levels of the multicast tree according to the routing table. Also, prerecorded data may be pre-fetched and viewed data may be expired during playback of the streamed data. A determination can be made to determine whether a latency of one of the helper nodes exceeds a predefined threshold latency using the content index received from the master node.

In one aspect, one of the helper nodes, having the latency equal to or greater than the predefined threshold latency, may be moved (e.g., reconnected) and/or dynamically reconfigured to directly connect with the master node and/or moved to another position in the multicast tree to lower the latency below the predefined threshold latency. Redistribution permissions may be granted to the helper nodes, having the latency equal to or greater than the predefined threshold latency.

For adding a node to the multicast tree, a master node may be contacted by a new helper node to join the multicast tree. A configuration listing of the multicast tree may be provided to new helper node. A service ping may be issued to each one of the helper nodes in the multicast tree according to the configuration listing. A determination operation may be performed to determine one or more of the closest helper nodes to the new helper node according to a service ping-back response. The new helper node may be added to the multicast tree using a service ping. Permission may be granted (e.g., from the master node and/or from one of the closest helper nodes) to the new helper node to be a distribution target in the routing table for receiving the streamed data. The master node may adjust the streaming of the data by the master node according to a bandwidth, a predefined latency threshold, and a predefined tolerance level of each of the plurality of helper nodes.

While some uses of the multicast tree or network have been described with respect to streaming data or media data, the multicast system may be used in other types of computing environments. One example use for the multicast tree may be to provide a multi-cast load balancer. In one specific example case, the latency of the overall tree may be set to be a short period (e.g., 5-100 milliseconds). A copy of a video may then be sent to multiple outputs or clients in a write fashion to enable each copy of the video to be processed in a different way (e.g., applying different types of processing). For example, each "channel" or output from a helper node may perform independent operations such as: edge detection, shading, compositing or other video work and then the resulting video streams may be combined into a single final video stream or stored file. In a similar example, each node in the cluster may take a segment of frames (e.g., modulo 100 or 1000) and then many nodes in a cluster or many clusters can work on the portions of the frames received by the node or clusters. The segments of the frames may then be recombined together by other processes, helper nodes, or network nodes.

In a reverse example of a use of the multicast tree, an elastic load balancer (ELB) in a read mode may read segments of data from many different systems in the adjacency network through the helper nodes and then that data may be combined together at the root of the tree (e.g., the master node 110). In a further example, clients may receive data from helper nodes that are part of the same adjacency network and each client may receive the same data regardless of which one of the helper nodes the client gets routed to through the load balancer.

The multicast tree described in this disclosure may also be used for database cluster multi-cast communications. For example, the multi-cast tree may be used in database replication where each stream coming from a helper node may be archived to a different storage location. In another example, the multicast tree may be also be used in a database cluster where multiple writers are writing to a clustered database. The multicast tree may be used to get the all clear for semaphores when the locks get released in a database cluster.

In some multi-cast databases, there are roles in the cluster with leaders and alternative leaders. A consensus algorithm may be used to distribute proposed writes or changes using the multi-cast tree, and then the return votes may be sent in with unicast connections. The multi-cast tree may also be used for distributed writes from multiple nodes which are part of the cluster, and the nodes who get the writes accept the writes and resolve them. Using this type of system may ensure that there is eventual consistency or strong consistency.

Figure 8:
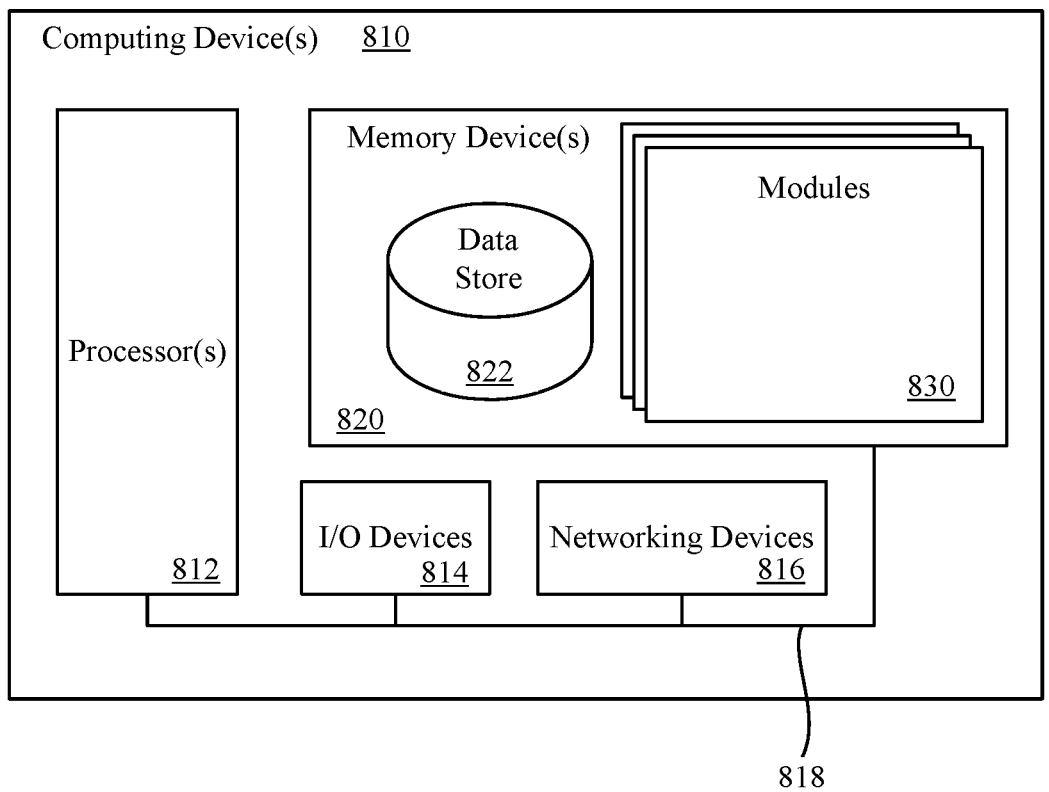
FIG. 8 is a block diagram that provides an example illustration of a computing device that may be employed in the present technology.

FIG. 8 illustrates a computing device 810 on which modules of this technology may execute. A computing device 810 is illustrated on which a high level example of the technology may be executed. The computing device 810 may include one or more processors 812 that are in communication with memory devices 820. The computing device may include a local communication interface 818 for the components in the computing device. For example, the local communication interface may be a local data bus and/or any related address or control busses as may be desired.

The memory device 820 may contain modules 824 that are executable by the processor(s) 812 and data for the modules 824. The modules 824 may execute the functions described earlier. A data store 822 may also be located in the memory device 820 for storing data related to the modules 824 and other applications along with an operating system that is executable by the processor(s) 812.

Other applications may also be stored in the memory device 820 and may be executable by the processor(s) 812. Components or modules discussed in this description that may be implemented in the form of software using high programming level languages that are compiled, interpreted or executed using a hybrid of the methods.

The computing device may also have access to I/O (input/output) devices 814 that are usable by the computing devices. An example of an I/O device is a display screen that is available to display output from the computing devices. Other known I/O device may be used with the computing device as desired. Networking devices 816 and similar communication devices may be included in the computing device. The networking devices 816 may be wired or wireless networking devices that connect to the Internet, a LAN, WAN, or other computing network.

The components or modules that are shown as being stored in the memory device 820 may be executed by the processor 812. The term "executable" may mean a program file that is in a form that may be executed by a processor 812. For example, a program in a higher level language may be compiled into machine code in a format that may be loaded into a random access portion of the memory device 820 and executed by the processor 812, or source code may be loaded by another executable program and interpreted to generate instructions in a random access portion of the memory to be executed by a processor. The executable program may be stored in any portion or component of the memory device 820. For example, the memory device 820 may be random access memory (RAM), read only memory (ROM), flash memory, a solid-state drive, memory card, a hard drive, optical disk, floppy disk, magnetic tape, or any other memory components.

The processor 812 may represent multiple processors and the memory 820 may represent multiple memory units that operate in parallel to the processing circuits. This may provide parallel processing channels for the processes and data in the system. The local interface 818 may be used as a network to facilitate communication between any of the multiple processors and multiple memories. The local interface 818 may use additional systems designed for coordinating communication such as load balancing, bulk data transfer, and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices. The modules may be passive or active, including agents operable to perform desired functions.

The technology described here may also be stored on a computer readable storage medium that includes volatile and non-volatile, removable and non-removable media implemented with any technology for the storage of information such as computer readable instructions, data structures, program modules, or other data. Computer readable storage media include, but is not limited to, RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which may be used to store the desired information and described technology.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, and other wireless media. The term computer readable media as used herein includes communication media.

Reference was made to the examples illustrated in the drawings, and specific language was used herein to describe the same. It will nevertheless be understood that no limitation of the scope of the technology is thereby intended. Alterations and further modifications of the features illustrated herein, and additional applications of the examples as illustrated herein, which would occur to one skilled in the relevant art and having possession of this disclosure, are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. One skilled in the relevant art will recognize, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

What is claimed is:

1. A non-transitory computer-readable medium for providing a low latency multicast structure for data distribution in computing service environment, the computer-readable medium comprising executable instructions, which when executed by a processor of a computer system, cause the processor to:
   configure, by a master node, a plurality of helper nodes in a one-to-many structure in a multicast tree for data streaming;
   receive network requests at the master node from the plurality of helper nodes in order to construct pingback responses from the master node to the plurality of helper nodes;
   send, from the master node, the pingback responses to the plurality of helper nodes;
   receive, by the master node, reports from the plurality of helper nodes indicating times taken to receive communications from the master node as determined from the pingback responses received at the plurality of helper nodes;
   establish, by the master node, a network latency for each of the plurality of helper nodes according to the reports received from the plurality of helper nodes, wherein the network latency is used to form a broadcast timing index;
   create, by the master node, routing tables from the broadcast timing index for local multicast routing at helper nodes within the multicast tree;
   send the routing tables from the master node to each of the plurality of helper nodes to arrange helper nodes in proximity to one another and create helper tiers within the multicast tree; and
   stream data from the master node to the plurality of helper nodes according to a center-to-edge order of the multicast tree based on the routing table.

2. The non-transitory computer-readable medium of claim 1, wherein the executable instructions further stream a content index for a prerecorded media file to each of the plurality of helper nodes.

3. The non-transitory computer-readable medium of claim 1, wherein the executable instructions further:
   send the routing tables for local multicast routing from the master node to each of the plurality of helper nodes in a first level of the multicast tree;
   send the routing tables for local multicast routing from the master node to identified helper nodes in an Nth layer according to the routing table; and
   forward streamed data via each of the plurality of helper nodes to identified helper nodes in the Nth layer according to the routing tables.

4. The non-transitory computer-readable medium of claim 1, wherein the executable instructions further poll the master node from the plurality of helpers for a broadcasting status via a representational state transfer (REST) application protocol interface (API).

5. The non-transitory computer-readable medium of claim 1, wherein the executable instructions further:
   provide a countdown using a REST API indicating a start time for streaming content index data; and
   send media content corresponding to a content index to the plurality of helpers.

6. The non-transitory computer-readable medium of claim 1, wherein the executable instructions further add new helper nodes to the multicast tree.

7. A computer-implemented method for providing a low latency multicast of data in a computing service environment, comprising:
   identifying, by a master node, a plurality of helper nodes in the computing service environment;
   receiving network requests at the master node from the plurality of helper nodes;
   receiving reports from the plurality of helper nodes to establish a network latency for the plurality of helper nodes, wherein the network latency is established using times taken to receive, at the plurality of helper nodes, responses from the master node to the network requests;
   creating a broadcast timing index using the network latency;
   sending from the master node to each of the plurality of helper nodes a routing table created from the broadcast timing index for local multicast routing to form a multicast tree and to create a plurality of helper tiers within the multicast tree; and
   streaming data from the master node to the plurality of helper nodes according to the routing table.

8. The method of claim 7, further comprising streaming a content index for a prerecorded media file to each of the plurality of helper nodes.

9. The method of claim 7, further comprising sending the routing tables for local multicast routing to each of the plurality of helper nodes in a first level of the multicast tree.

10. The method of claim 7, further comprising forwarding streamed data via a helper node in a first level of the multicast tree to identified helper nodes in an additional level of the multicast tree according to the routing table.

11. The method of claim 7, further comprising polling the master node by the plurality of helpers for a broadcasting status via a representational state transfer (REST) application protocol interface (API).

12. The method of claim 7, further comprising:
   providing a countdown using a REST API indicating a start time for streaming content index data; and
   sending media content corresponding to a content index to the plurality of helpers.

13. The method of claim 7, further comprising sending pre-fetch prerecorded data and expiring viewed data during playback of streamed data.

14. The method of claim 7, further comprising determining whether a latency of one of the plurality of helper nodes exceeds a predefined threshold latency using a content index received from the master node.

15. The method of claim 14, further comprising moving the one of the plurality of helper nodes, having the latency equal to or greater than the predefined threshold latency, to directly connect with the master node or to another position in the multicast tree to lower the latency below the predefined threshold latency.

16. The method of claim 7, further comprising:
   receiving contact at the master node by a new helper node to join the multicast tree;
   providing a configuration listing of the multicast tree to the new helper node;
   issuing a service network request by the new helper node to each one of the plurality of helper nodes in the multicast tree according to the configuration listing;
   determining one or more close helper nodes to the new helper node according to a service pingback response;

receiving permission for the new helper node to be a distribution target in the routing table from one of the close helper nodes for receiving streamed data; and adding the new helper node to the multicast tree.

17. The method of claim 7, further comprising adjusting the streaming of the data at the helper nodes, by the master node, according to an output bandwidth at a helper node, a predefined latency threshold, and a predefined latency tolerance level of each of the plurality of helper nodes.

18. The method of claim 7, further comprising using the multicast tree in at least one of a multicast load balancer, a dynamic adjacency table, or a multicast database cluster.

19. A method for providing a low latency multicast of data distribution in computing service environment, comprising:

configuring, by a master node, a plurality of helper nodes in a one-to-many structure in a multicast tree for data streaming;

receiving a ping at the master node from each one of the plurality of helper nodes;

receiving reports from the plurality of helper nodes to establish a network latency for each one of the plurality of helper nodes, wherein the network latency is established using times taken to receive, at the plurality of helper nodes, responses from the master node to the network requests;

creating a broadcast timing index representing network latency for the helper nodes at the master node;

creating routing tables from the broadcast timing index for local multicast routing at the helper nodes within the multicast tree;

sending the routing tables for local multicast routing from the master node to each of the plurality of helper nodes in a first level of the multicast tree and to identified helper nodes in one or more additional layers; and multicasting a media file from the master node to the plurality of helper nodes according to a center-to-edge order of the multicast tree based on the routing tables;

determining one of the plurality of helper nodes has a broadcast latency below a predefined latency threshold; and reconfiguring one of the plurality of helper nodes dynamically within a cluster for the multicast tree to reduce a broadcast latency below the predefined latency threshold.

20. The method of claim 19, further comprising:

sending the routing tables for local multicast routing to each of the plurality of helper nodes in a first level of the multicast tree; and forwarding streamed data via a helper node in a first level of the multicast tree to identified helper nodes in one or more levels of the multicast tree according to the routing tables.

* * * * *